United States Patent

[11] 3,603,005

[72] Inventor Willis N. Dysart
4532 Whittier Blvd., Los Angeles, Calif. 90022

[21] Appl. No. 854,818
[22] Filed Sept. 3, 1969
[45] Patented Sept. 7, 1971

[54] MATHEMATICAL TEACHING AID
13 Claims, 19 Drawing Figs.

[52] U.S. Cl. .................................................... 35/30, 235/89
[51] Int. Cl. .................................................... G09b 19/02, G06c 3/00
[50] Field of Search .......................................... 35/30, 31, 31 E, 31 F, 31 G; 235/85, 89

[56] References Cited
FOREIGN PATENTS
1,083,188 6/1954 France .......................... 35/31 E

*Primary Examiner*—Wm. H. Grieb
*Attorney*—Barnes, Kisselle, Raisch & Choates

ABSTRACT: A mathematical teaching aid which presents a student with a variety of algebraic summation problems by positioning a space selector mask member over a base member having a grid with a plurality of rows and columns of spaces each containing a numerical value. The mask member segregates a portion of the spaces of the grid into two groups with the algebraic sum of the numerals of the spaces in one group being equal to the algebraic sum of the numerals of the spaces in the other group.

INVENTOR.
WILLIS N. DYSART
BY Barnes, Kisselle, Raisch & Choate
ATTORNEYS

INVENTOR.

WILLIS N. DYSART

BY

Barnes, Kisselle, Raisch & Choate

ATTORNEYS

INVENTOR.
WILLIS N. DYSART
BY
Barnes, Kisselle,
Raisch & Choate
ATTORNEYS

INVENTOR.
WILLIS N. DYSART
BY
Barnes, Kisselle, Raisch & Choate
ATTORNEYS

INVENTOR
WILLIS N. DYSART
BY Barnes, Kisselle, Raisch & Choate
ATTORNEYS

INVENTOR
WILLIS N. DYSART
BY Barnes, Kisselle, Raisch & Choate
ATTORNEYS

MATHEMATICAL TEACHING AID

DESCRIPTION OF THE INVENTION

This invention relates to educational devices and more particularly to an improved device for assisting in the teaching of algebraic summation of groups of numerals including algebraic summation problems involving multiplication and division subproblems.

A principal object of this device is to stimulate student interest in mathematical problems.

Another object of this device is to provide a student with a series of groups of numerals to be algebraically summed.

Another object of this device is to provide a student with a means of checking his answer to the summation of a group of numerals which reenforces and provides further practice with the algebraic summation process.

Another object of this device is to provide a student with a series of algebraic summation problems involving multiplication or division subproblems or both.

Another object of this invention is to provide a simple and relatively inexpensive device for providing a student with a multiplicity of different algebraic summation problems.

Other objects and features of this invention will be apparent from the following description and drawings in which there is found the manner of making, using and carrying out this invention in the best mode contemplated by the inventor.

Figures 1, 2:
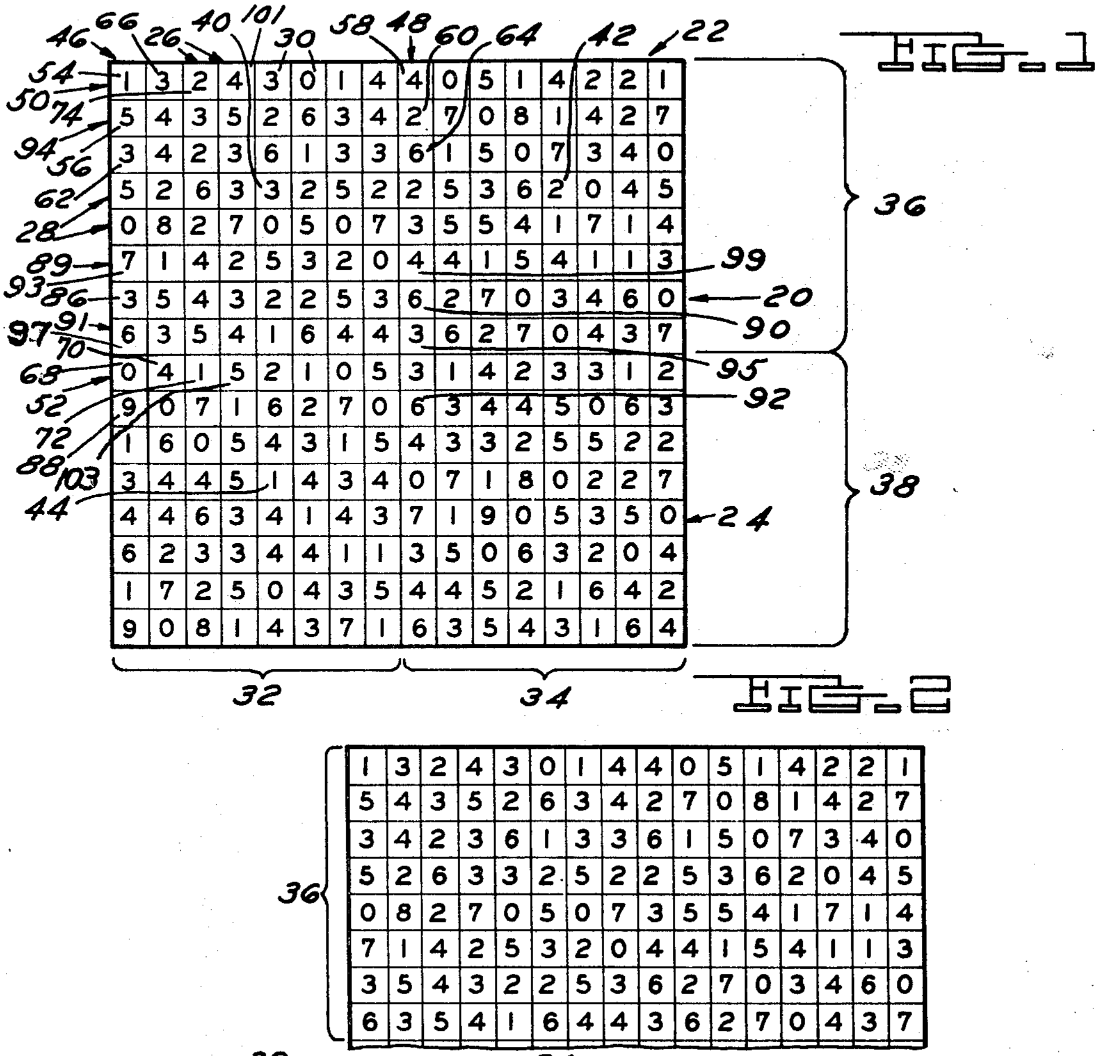

Drawings accompany this disclosure and the various views thereof may be described as:

FIG. 1, a top view of a base member having a grid with positive numerals thereon.

FIG. 2, a top view of the upper row semigrid of the grid with positive numerals of FIG. 1.

Figure 3:
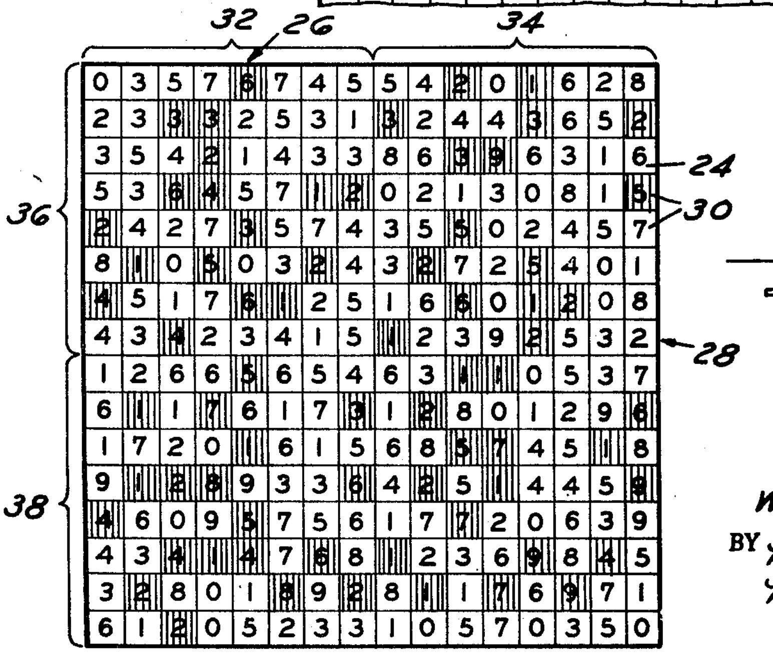

FIG. 3, a top view of a base member having a grid with both positive and negative numerals thereon.

Figure 4:
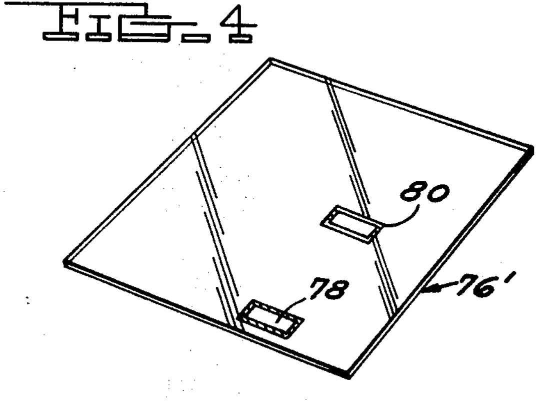

FIG. 4, a perspective view of one embodiment of an overlying mask member.

Figures 5, 6:
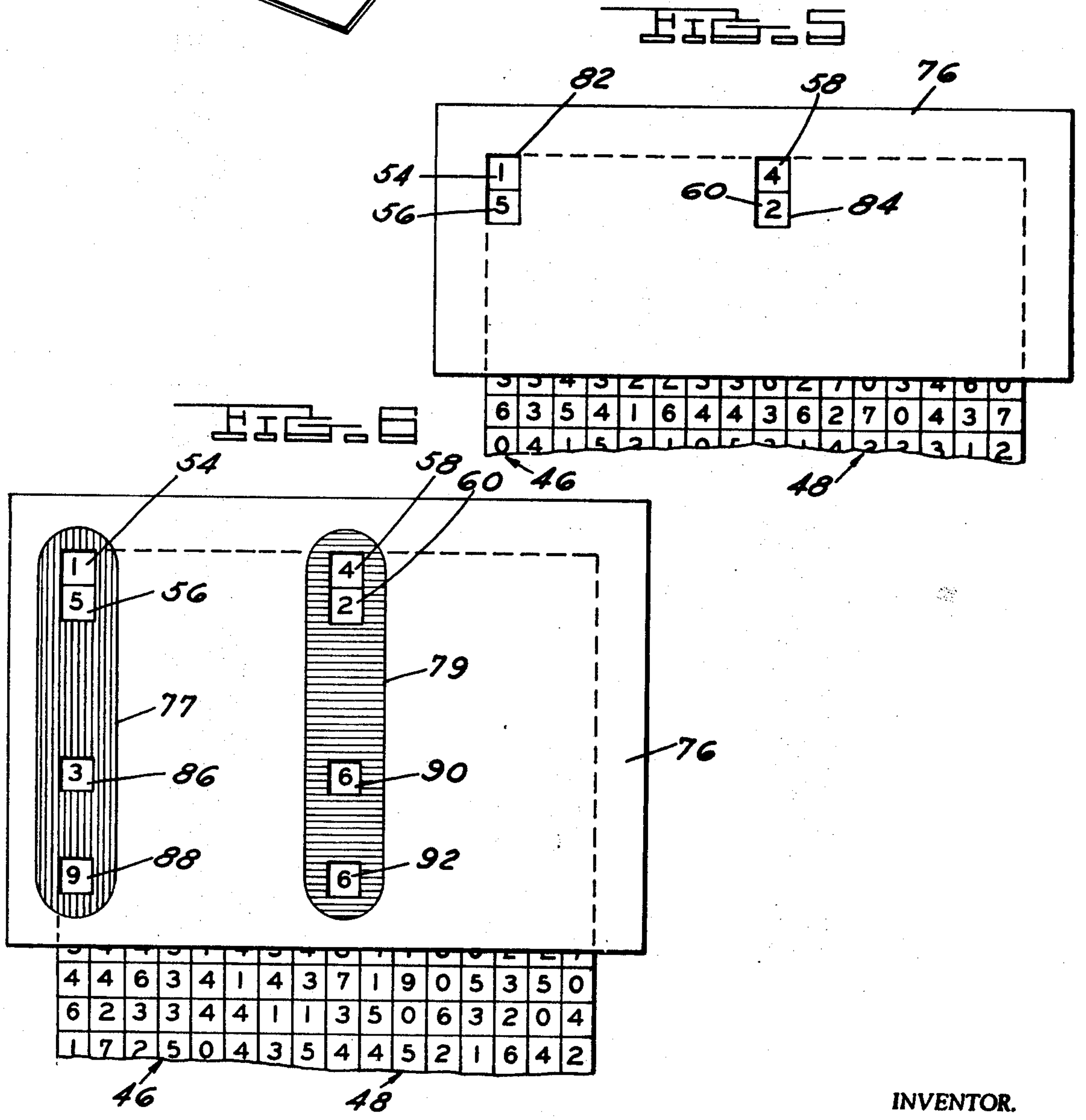

FIG. 5, a top view of a second embodiment of a mask member overlying the base member of FIG. 1 with the space indicator means positioned on the mask in accordance with Rule A.

FIG. 6, a top view of a mask member overlying the base member of FIG. 1 with the indicator means being positioned on the member in accordance with Rule A.

Figure 7:
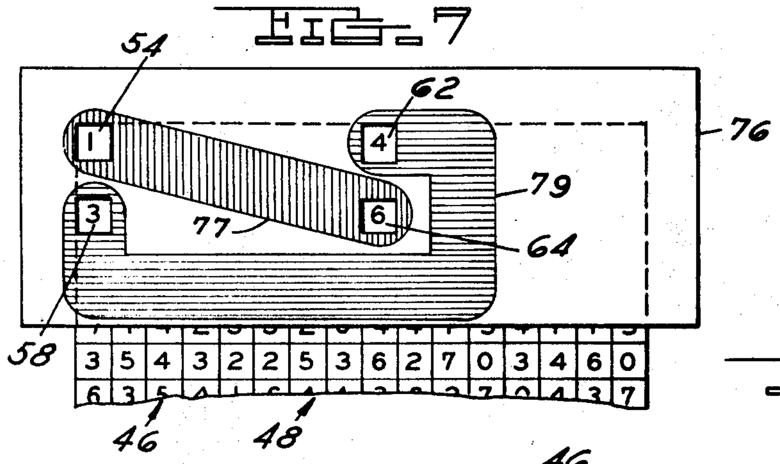

FIG. 7, a top view of a mask member overlying the base member of FIG. 1 with the indicator means being positioned on the member in accordance with Rule B.

Figure 8:
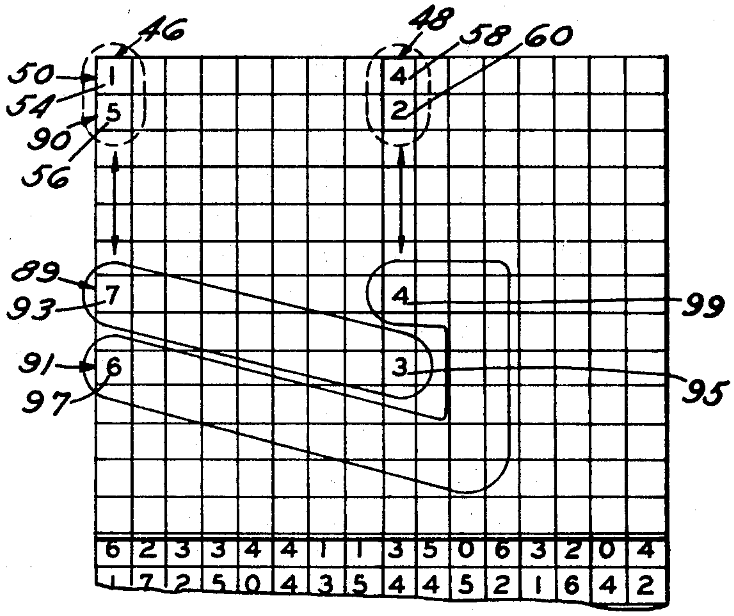

FIG. 8, a top view of the base member of FIG. 1 showing only selected numerals.

Figure 9:
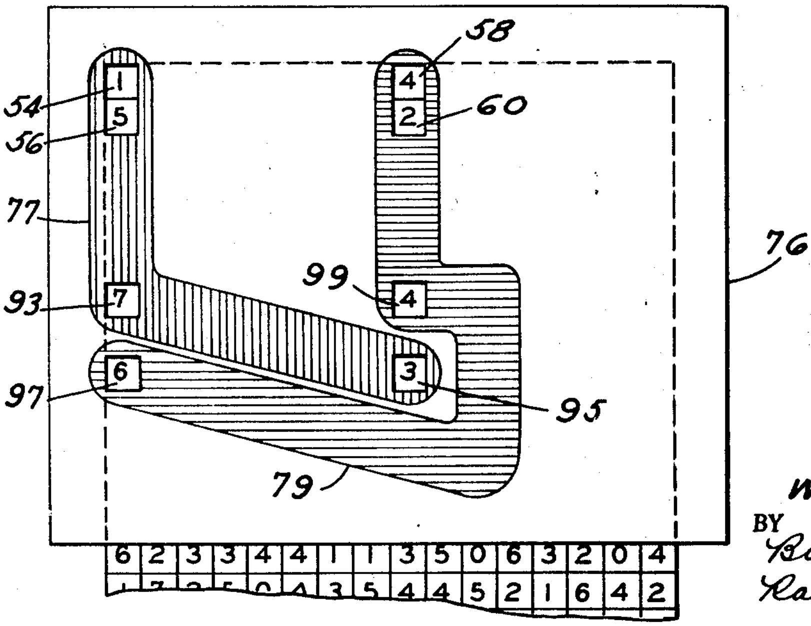

FIG. 9, a top view of a mask member overlying the base member of FIG. 1 with the indicator means being positioned on the member in accordance with Rule C.

Figures 10, 11, 12, 13:
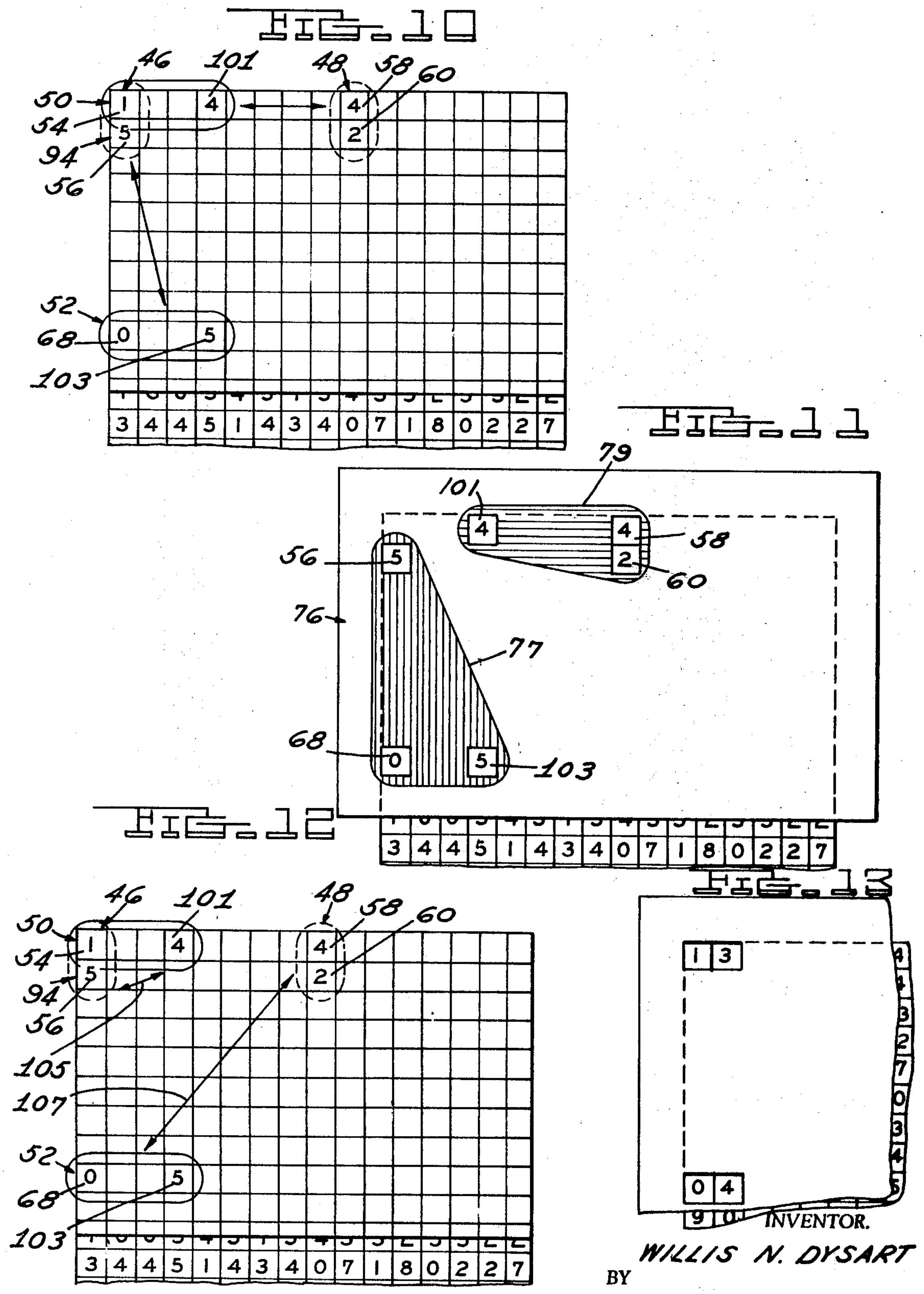

FIG. 10, a top view of the base member of FIG. 1 showing resulting groups of numerals in accordance with Rule D.

FIG. 11, a top view of a mask member overlying FIG. 1 with indicator means positioned in accordance with Rule D.

FIG. 12, a top view of the base member and subgroups of FIG. 10 with a second combination of the subgroups.

FIG. 13, a top view of the mask member and base member of FIG. 5 with the mask overlying and parallel to the rows of the mask member.

Figure 14:
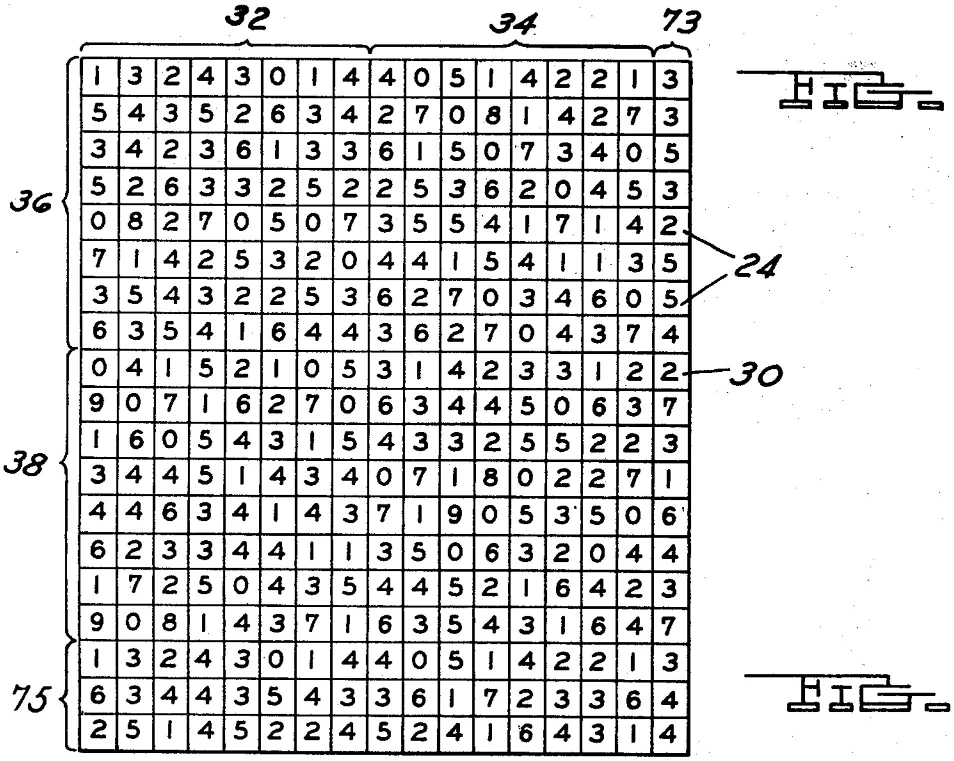

FIG. 14, a top view of a base member having three column and three row semigrids.

Figures 15, 18:
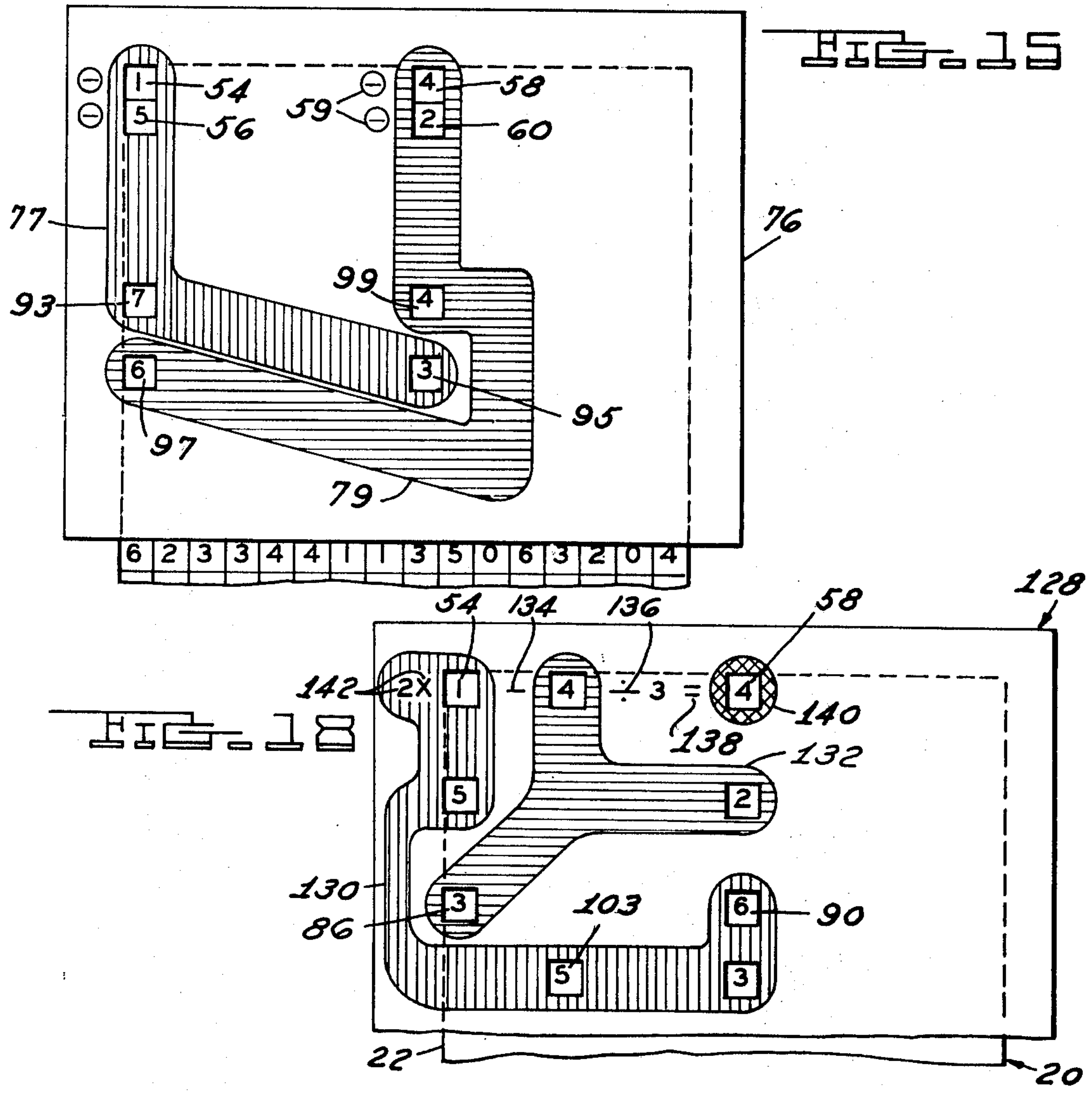

FIG. 15, a top view of a mask member overlying the base member of FIG. 1 with the indicator means positioned on the member in accordance with Rule C illustrating subgroups to be subtracted from the main groups.

Figures 16, 17:
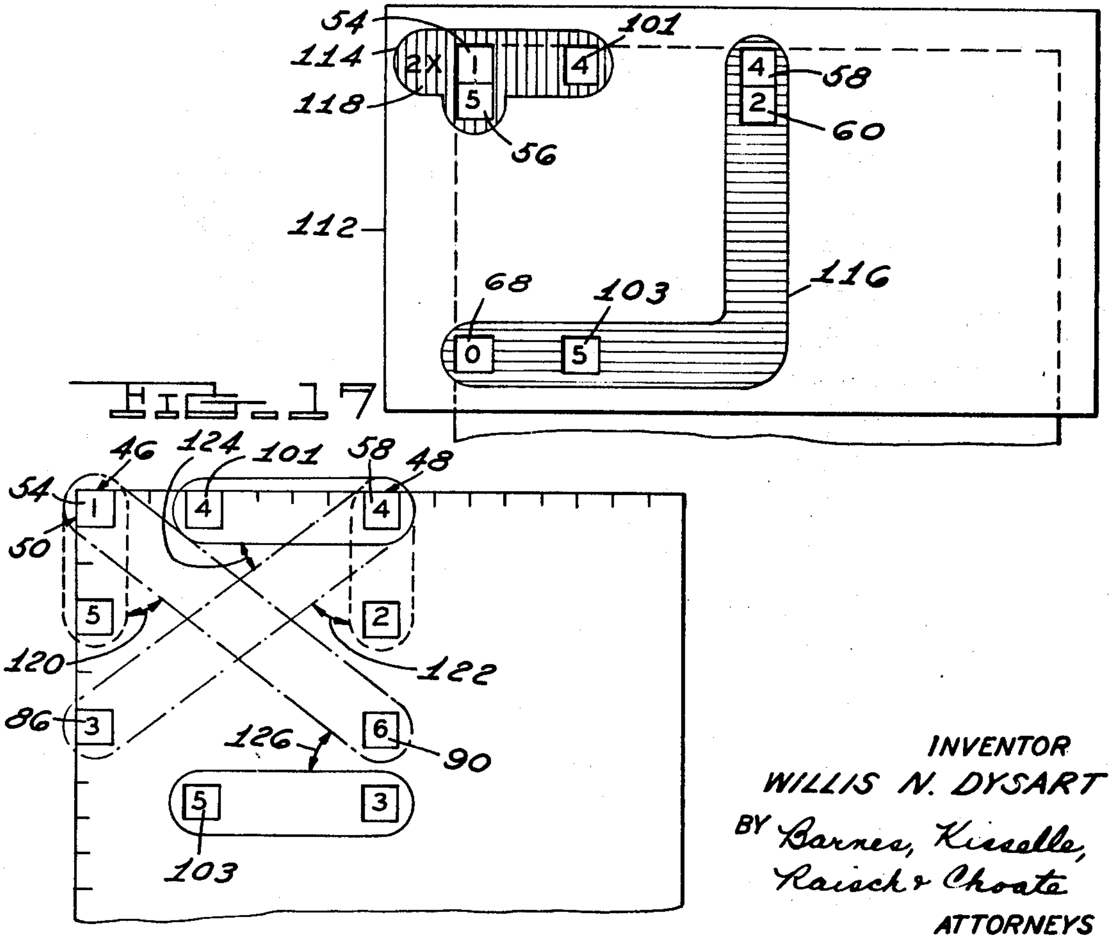

FIG. 16, a top view of a mask member overlying the base member of FIG. 1 with the indicator means positioned in accordance with Rule E.

FIG. 17, a top view of the base member of FIG. 1 showing only selected numerals and a proposed combination of subgroups of numerals.

FIG. 18, a top view of a mask member overlying FIG. 1 with the indicator means positioned in accordance with Rule F.

Figure 19:
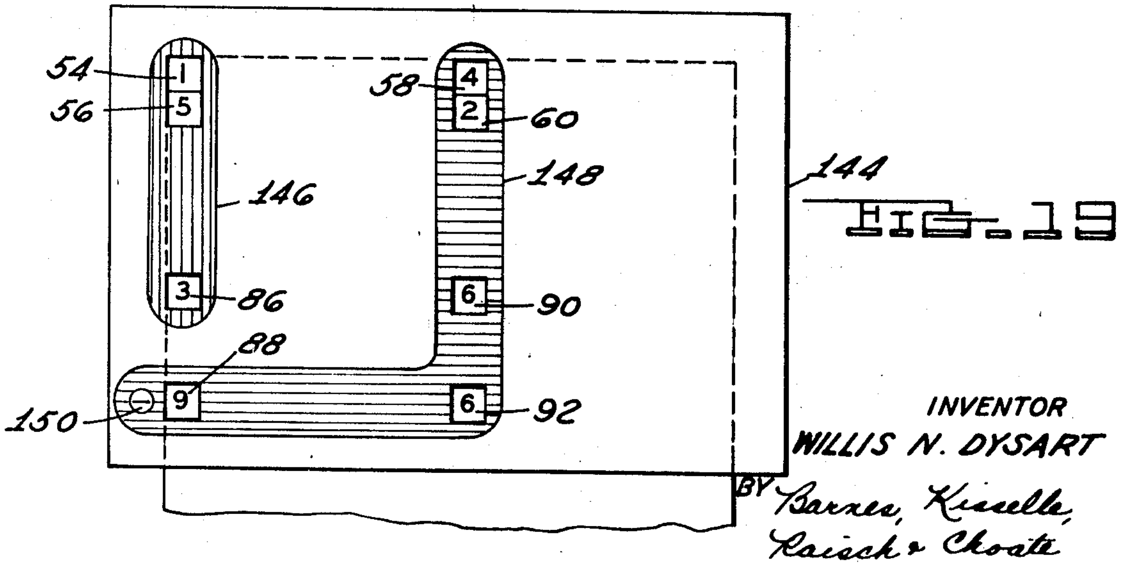

FIG. 19, a top view of a mask member overlying FIG. 1 with the indicator means positioned in accordance with Rule G.

Referring to the drawings:

In FIGS. 1 and 2, a base member 20 having a grid 22 comprising a plurality of spaces 24 arranged in a plurality of columns 26 and rows 28 is shown. In FIG. 1, only positive numerals 30 are placed in the spaces 24 and in FIG. 3 both positive and negative numerals 30 are placed in the spaces 24. In the preferred embodiment shown in FIG. 1, each grid 22 has 16 columns 26 and 16 rows 28 of spaces 24. The spaces can be considered to be arranged in two column semigrids 32, 34 each having the same number of columns 26 of spaces 24 or in two row semigrids 36, 38 each having the same number of rows 28 of spaces 24. Each space 24 in one semigrid has a space in a corresponding position, hereafter termed a corresponding space, in the other semigrid. For example, when the space 40 in FIG. 1 is considered to be in the column semigrid 32 it has a corresponding space 42 in the column semigrid 34 and when space 40 is considered to be in the row semigrid 36 it has a corresponding space 44 in the row semigrid 38. Stated in another way, if the column semigrid 32 were superimposed on the column semigrid 34, the corresponding spaces 40, 42 would coincide. In a similar manner each column 26 in one semigrid has a corresponding column in the other semigrid and each row 28 in one semigrid has a corresponding row in the other row semigrid. For example, column 46 in column semigrid 32 has a corresponding column 48 in column semigrid 34 and row 50 in row semigrid 36 has a corresponding row 52 in row semigrid 38.

The values of the numerals 30 in the spaces 24 are selected so that the algebraic sum of the numerals in any two abutting spaces in a row or a column of one semigrid is equal to the algebraic sum of the numerals in the two corresponding abutting spaces in a corresponding column or a corresponding row of the other semigrid. For example, in FIG. 1 the algebraic sum of the numerals 1 and 5 in the spaces 54, 56 of column 46 of semigrid 32 is equal to the algebraic sum of numerals 4 and 2 in the corresponding abutting spaces 58, 60 of the corresponding column 48 in the other column semigrid 34. The numerical values for spaces 24 are determined by arbitrarily selecting any two numerical values for the first and second spaces 54, 56 of column 46 and then determining any combination of two values whose algebraic sum is equal to the algebraic sum of the arbitrarily selected values for spaces 54, 56. The two numerical values of the combination are then placed in the corresponding first and second spaces 58, 60 of the corresponding column 48. This process is repeated until numerical values have been determined for all of the first and second spaces of all of the columns. For example, as shown in FIG. 1 the numerical values 1 and 5 were arbitrarily selected for the spaces 54 and 56 of column 46 and the combination of 4 and 2 was determined for the corresponding spaces 58, 60 of the corresponding column 48. After numerical values for the first and second spaces of all of the columns have been determined, an arbitrary value is selected for the third space 62 of the first column 46 which determines the value which must be placed in the corresponding third space 64 of the corresponding column 48 so that the algebraic sum of the numerals in the second and third abutting spaces 56, 62 of the column 46 will be equal to the corresponding abutting spaces 60, 64 of the corresponding column 48. For example, in FIG. 1 the numerical value 3 was arbitrarily selected for the third space 62 of the column 46 which dictates a numerical value of 6 for the corresponding third space 64 of the corresponding column 48. This process is repeated until numerical values have been determined for each of the second and third spaces of all of the columns. The above steps are repeated until numerical values have been determined for each of the spaces 24 in the upper row semigrid 36 of all of the columns. As shown in FIG. 2, the above procedure determines a numerical value for each space 22 in the upper row semigrid 36 which contains one half of the total number of spaces 24 in the grid 22.

The numerical values for the spaces 24 in the lower row semigrid 38 (or as explained hereinafter lower row semigrids 38 and 75) are determined by first selecting a combination of two numerical values for the first and second spaces 68, 70 of the row 52 of the grid 22 whose algebraic sum is equal to the algebraic sum of the corresponding abutting spaces 54, 66 in the corresponding row 50. For example, in FIG. 1 the numerical values of 0 and 4 were selected for the first and second spaces 68, 70 of the row 52 whose algebraic sum is equal to the sum of the values 1 and 3 which are in the corresponding first and second spaces 54, 56 of the corresponding row 50. This procedure is repeated until numerical values have been determined for the first and second spaces of each of the rows in the lower row semigrid 38 (or as explained hereinafter lower row semigrids 38 and 75). Then a value for the third space 72 of the row 52 is selected so that the algebraic summation of the second and third spaces 70, 72 of the row 52 of the semigrid 38 is equal to the algebraic summation of the corresponding second and third spaces 66, 74 of the corresponding row 50 of the row semigrid 36. For example, in FIG. 1 the numerical value of the third space 72 of the row 52 must be 1 so that the algebraic sum of the numerals in the second and third spaces 70, 72 of the row 52 is equal to the algebraic sum of the numerical values in the corresponding second and third spaces 66, 74 of the corresponding row 50. This step is repeated until the numerical values for the third space of each row in the lower row semigrid 38 has been determined. The above steps are repeated until values are determined for each of the spaces 24 in the lower row semigrid 38.

The above procedure determines a numerical value for each space 24 of the grid 22 so that the algebraic sum of any two abutting spaces in a row or a column in one semigrid is equal to the algebraic sum of the numerals in the two corresponding abutting spaces in the corresponding row or the corresponding column of the other semigrid. By a careful selection of the arbitrary values in the above procedure, it is possible to produce a grid which has only zero and positive numerical values such as the grid shown in FIG. 1. It is also possible to produce a grid which has both positive, zero and negative values such as the grid shown in FIG. 3. In FIG. 3 the positive and zero numerical values are in black and the negative numerical values are in red.

While it is preferred to form the grids with an equal number of columns and rows of spaces, it is not necessary to do so. For example, grid 71 illustrated in FIG. 14 is formed with 17 columns and 19 rows of spaces. Grid 71 includes all of the numerals 30 of the grid 22 of FIG. 1 plus one additional column and three additional rows of spaces with numerals. Grid 71 can be considered to be formed with two full column semigrids 32 and 34 plus an additional partial third column semigrid 73. Likewise, grid 71 can be considered to be formed with two full row semigrids 36 and 38 plus an additional partial third row semigrid 75. Each space 24 in the third column 73 or row 75 semigrid has a corresponding space in the first and second column 32, 34 or row 36, 38 semigrid. However, since third column 73 and row 75 semigrids are only partially full semigrids, every space 24 in the first and second column 32, 34 or row 36, 38 semigrids does not have a corresponding space in the third column 73 or row 75 semigrid. In arranging the spaces of a grid into column and row semigrids for purposes of applying the above rules each full column or full row semigrid must have the same number of columns or rows and the same number of columns in a full column semigrid as there are rows in a full row semigrid. For example, grid 71 contains eight columns in each full column semigrid and eight rows in each full row semigrid and there is the same number of columns in each full column semigrid as the number of rows in a full row semigrid, namely eight. The above numerical value rules are simply applied to all three column 32, 34, 73 and all there row 36 38, 75 semigrids to determine the numerical values for the numerals 30 in each of the spaces 24 of grid 71.

In FIG. 4, a first embodiment of a mask member 76′ formed from a sheet of transparent material with translucent or opaque indicator means 78, 80 is shown. When the mask member 76′ is positioned to overlie at least a portion of the base member 20, the indicator means 78, 80 segregates a portion of the spaces 24 of the grid 22 into two groups. Another embodiment of a mask member 76 is shown in FIG. 5 overlying the base member 20 of FIG. 1. In this embodiment the mask member is formed from a sheet of translucent or opaque material having apertures 82, 84 therein which function as indicator means to segregate a portion of the spaces 24 of the grid 22 into two groups.

The indicator means are positioned on the mask member 76 so that they will segregate a portion of the spaces 24 on the grid 22 into separate groups which are determined by the following rules or various combinations of these rules:

Rule A: The sum of the numerals in any even number of spaces in a column or row in one semigrid with zero or an even number of intermittent spaces between each pair of adjacent spaces of the even number to be summed, is equal to the sum of the numerals in the corresponding spaces in the corresponding column or the corresponding row in the other semigrid. For example, as shown in FIGS. 5 and 6 the indicator apertures are positioned in the mask member 76 so that they segregate spaces into two groups in accordance with Rule A. In FIG. 5 there are two indicator apertures positioned so that the first and second spaces 54, 56 of the column 46 in semigrid 32 are segregated into one group whose algebraic sum is equal to the algebraic sum of the values in the corresponding spaces 58, 60 of the corresponding column 48 of the semigrid 34. In FIG. 5 the indicator means segregates two spaces in each column which is an even number of spaces and the two spaces are abutting each other so there are zero intermittent spaces between the adjacent pair of spaces to be summed. In the mask member 76 shown in FIG. 6 the indicator means 77, 79 are arranged so that there are zero spaces between the spaces 54, 56 of the column 46, four spaces between the adjacent spaces 56, 86 of the column 46 and two spaces between the adjacent spaces 86, 88 of the column 46. The corresponding spaces in the corresponding column 48 in the semigrid 34 are spaces 58, 60, 90 and 92. The configuration of FIG. 6 complies with the requirements of Rule A and it can be seen that the algebraic summation of the numerical values in each group is the same.

Rule B: The sum of the numerals in an even number of spaces selected from corresponding columns or rows so that each pair of adjacent spaces, the numerals of which are to be summed, has both an odd number of rows or columns between the spaces and the two spaces of the adjacent pair of aces are located in opposite semigrids is equal to the sum of the numerals in the corresponding spaces in the corresponding column or row. Rule B is illustrated in the mask 76 of FIG. 7 in which the first space 54 of the column 46 in semigrid 32 is grouped with the third space 64 in the corresponding column 48 of the semigrid 34 and the corresponding spaces 58, 62 form the second group to be summed. The adjacent spaces 54, 64 in corresponding columns 46, 48 have one row 94 between them. It should be noted that Rule B requires that an odd number of rows be between adjacent spaces in corresponding columns and that the adjacent spaces be located in opposite semigrids.

Rule C: A first subgroup of spaces determined in accordance with Rule A or B can be combined with a second independent subgroup of spaces determined in accordance with Rule A or B and the algebraic sum of the numerals of the spaces of the resulting two groups of spaces each to be summed is equal. Rule C is based on the concept that if equal sums are added or subtracted from equal sums the resulting sums are still equal. FIG. 8 shows a portion of the numerals in the spaces of the grid of FIG. 1 with a first subgroup of spaces 54, 56 and 58, 60 indicated by broken line circles which have been selected in accordance with Rule A, a second subgroup spaces 93, 95 and 97, 99 indicated by solid circles which have been selected in accordance with Rule B, and arrows indicating a proposed combination involving either addition or subtraction of the subgroups in accordance with Rule C. FIG. 9 illustrates a mask 76 in which the indicator means of the subgroups determined in accordance with Rules A and B, as shown in FIG. 8, have been combined in accordance with Rule C to produce the resulting two groups of spaces, the numerals of which are to be added to result in equal sums. FIG. 15 illustrates a mask 76 in which the subgroups of FIG. 9 have been combined in accordance with Rule C to produce two resulting groups of spaces in which some of the numerals in some of the spaces, as indicated by the adjacent negative sign indicia 59, in each resulting group are to be subtracted to result in equal sums.

Rule D: If a first subgroup of spaces determined in accordance with Rules A, B or C is combined with a second subgroup of spaces determined in accordance with Rule A, B or C so that a single space appears only once in each of the two resulting groups, the algebraic sums of each of the two resulting groups with the single space removed from both of the two resulting groups are equal. Rule D is based on the concept that if equal numerical values are deducted from equal sums, the resulting remainders are equal. FIG. 10 shows numerical values in a portion of the grid of FIG. 1 and has a first subgroup 54, 56 and 58, 60 selected in accordance with Rule A indicated by broken circles, a second subgroup 54, 101 and 68, 103 indicated by solid circles which has also been selected in accordance with Rule A, and arrows indicating a proposed combination of the two subgroups. As shown in FIG. 10, the space 54 appears once and only once in both of the two resulting groups that have been determined in accordance with Rules A and D and are indicated by the arrows. In accordance with Rule D the space 54 can be eliminated from both of the two resulting groups. In FIG. 11 a mask overlying FIG. 10 and having indicator means 77, 79 positioned in accordance with Rule D is shown. It should be noted that in applying Rule D care must be exercised in the determination of the combinations of subgroups to produce two resulting groups in which a single space appears only once in each resulting group. As shown in FIG. 12, the other combination of the subgroups shown in FIG. 10 would produce two resulting groups in which the single space 54 would appear twice in one of the resulting groups and would not appear at all in the other resulting group.

Rule E: If two or more subgroups of spaces determined in accordance with rules A, B or C or a combination of A, B or C are combined so that a single space appears two or more times in one of the resulting groups and does not appear in the other resulting group, the numeral in that space can be multiplied by the number of times it appears in that one group and the algebraic sums of the numerals, including the product of the multiplication in that one group, in each of the resulting groups are equal. Arrows 105 and 107 in FIG. 12 illustrate a combination of a first subgroup of spaces 54, 56 and 58, 60 and a second subgroup of spaces 54, 101 and 68, 103 in which the space 54 appears twice in the resulting group of spaces indicated by arrow 105. FIG. 16 illustrates a mask 112 overlying FIG. 1 with the resulting group indicator means 114, 116 positioned in accordance with Rule E. A multiplication indicia 118 indicates that the numeral appearing in space 54 is to be multiplied by two. When the result of the multiplication is combined with the numerals in spaces 56 and 101, the sum is equal to the sum of the numerals in the resulting group of spaces 58, 60, 68, 103. Masks constructed in accordance with Rule E, such as mask 112, present a combined multiplication and algebraic summation problem.

Rule F: If two or more subgroups of spaces determined in accordance with Rules A, B, C, D or E or a combination of Rules A, B, C, D or E are combined so that a single space appears two or more times in one of the resulting groups and does not appear in the other resulting group, the single space can be removed from its resulting group and if the numerals in the remaining spaces of that resulting group are summed and then deducted from the sum of the numerals in the spaces of the other resulting group and the remainder is divided by the number of times the single space appeared in the one resulting group the quotient is equal to the numeral appearing in the single space. Arrows 120, 122, 124 and 126 in FIG. 17 illustrate a proposed combination of three subgroups of spaces selected in accordance with Rule F. Arrows 120 and 122 indicate a proposed combination of two subgroups indicated in FIG. 17 by dash circles and dot-dash circles selected in accordance with Rule E. The dash circle subgroup was selected in accordance with Rule A and the dot-dash subgroup by Rule B. A third subgroup of spaces indicated by solid line circles was selected in accordance with Rule A and combined with the other subgroups in accordance with Rule E as indicated by arrows 124 and 126 so that the single space 58 appears three times in one of the resulting groups. FIG. 18 illustrates a space selector 128 overlying FIG. 1 with the resulting group indicator means 130 and 132 positioned in accordance with Rule F. A minus sign indicia 134 indicates that the numerals appearing in resulting group 132 are deducted from resulting group 130 and a division sign indicia 136 indicates that the difference is divided by the number of times the single space appeared in the resulting group 132 and that the quotient is equal as indicated by indicia 138 to the numeral appearing in the single space indicated by indicator means 140. Since the dash and dot-dash circle subgroups were combined in accordance with Rule E, the numeral appearing in the single space 54 is multiplied by 2 as indicated by (2×) indicia 142. Masks constructed in accordance with Rule F, such as mask 128, present a combined multiplication, division and algebraic summation problem. If a student first covers indicator means 140 and then solves the problem presented by mask selector 128, the student's answer can be checked by comparing it with the answer indicated by indicator means 140.

Rule G: A space in one of two resulting groups determined in accordance with Rules A, B, C, D or E can be removed from one resulting group and transferred to and deducted from the other resulting group and the algebraic sum of the numerals of the spaces in the one resulting group is equal to the algebraic sum of the numerals in the other resulting group. This rule is based on the concept that when equal sums are deducted from equal sums their differences are equal. FIG. 19 illustrates a mask 144 overlying the grid of FIG. 1 with two resulting groups of spaces determined in accordance with Rule G indicated by indicator means 146 and 148. The resulting groups of spaces for mask 144 were first determined in accordance with Rule A, as shown in FIG. 6 and indicated by indicator means 77 and 79, and then space 88 was transferred from resulting group 77 to resulting group 79 in accordance with Rule G to construct mask 144 of FIG. 19. A negative sign indicia 150 indicates that the numeral in space 88 is to be deducted from the sum of the numerals in the other spaces in the resulting group indicated by indicator means 148. In transferring a space already associated with a negative sign indicia, for example, spaces 54, 56, 58 and 60 of FIG. 15, in accordance with Rule G the space becomes associated with a positive sign because the deduction or subtraction of a negative quantity is in effect an addition of that quantity. Masks constructed in accordance with Rule G provide a student with problems involving the deduction of certain numbers in obtaining an algebraic sum.

Masks, having indicator means arranged in accordance with the above rules or a combination of the above rules, which are positioned to overlie a base member will indicate or present two groups of numerals whose algebraic sums are equal. By placing the mask in a variety of positions overlying the base member, a student is presented with a large number of different algebraic summation problems. If the base member similar to FIG. 1 is used, all of the algebraic summation problems presented to a student involve only positive numerals; but if a base member having both positive and negative numerals, such as the base member shown in FIG. 3, is used, the student is presented with a variety of algebraic summation problems involving both positive and negative numerals. Since the mask member presents two groups of numerals to be summed, a student is provided with a means of determining if his answer to the summation of one of the groups is correct by simply summing the numerals of the second group. This arrangement provides a means of reenforcing the learning of the basic summation process as well as providing a means whereby the student can determine by himself if his answer to the summation of the first group was correct. It should be noted that in the preferred embodiments a mask member can be positioned to overlie a base member so that it is essentially in parallel alignment with either the columns or the rows of the base member. For example, as shown in FIG. 13, the space selector mask of FIG. 5 will also function properly if it is rotated 90° in either direction so that it is essentially parallel to the rows rather than the columns of the base member. If the masks are to be rotated 90° in either direction, the base members must be constructed so that there is at least one full row and column semigrid in each grid and that each full column semigrid has the same equal number of columns as each full row semigrid has rows. For example, in grid 71 each full column semigrid 32, 34 has eight columns and each full row semigrid 36, 38 has eight rows.

What is claimed as new is as follows:

1 A mathematical teaching aid which comprises:

a. a base member having at least one surface with a numerical grid comprising columns of spaces in at least two column semigrids with each space having a numeral that is selected so that the algebraic sum of the numerals in any two abutting spaces in a column of one semigrid is equal to the to the algebraic sum of the numerals in two corresponding abutting spaces in a corresponding column of another semigrid, and b. a space selector member which selectively overlies at least a portion of the grid having indicator means positioned in relation to each other and the spaces of the grid to segregate some of the spaces of the grid into at least two groups of spaces for mathematical processing such that the result of processing one group is numerically equal to the result of processing the other group or groups.

2. A mathematical teaching aid as defined in claim 1 in which said indicator means segregate some of said spaces into two groups of spaces with the algebraic sum of the numerals of the spaces in one group equaling the algebraic sum of the numerals of the spaces in the other group.

3. A mathematical teaching aid which comprises:

a. a base member having at least one surface with a numerical grid comprising two rows and columns of spaces in at least two row and two column semigrids with each space having a numeral that is selected so that the algebraic sum of the numerals in any two abutting spaces in a row or a column of one semigrid is equal to the algebraic sum of the numerals in two corresponding abutting spaces in a corresponding row or a corresponding column of another semigrid, and b. a space selector member which selectively overlies at least a portion of the grid having indicator means positioned in relation to each other and the spaces of the grid to segregate some of the spaces of the grid into at least two groups of spaces for mathematical processing such that the result of processing one group is numerically equal to the result of processing the other group or groups.

4. A mathematical teaching aid as defined in claim 2 in which said indicator means segregate some of said spaces into two groups of spaces with the algebraic sum of the numerals of the spaces in one group equaling the algebraic sum of the numerals of the spaces in the other group.

5. A mathematical teaching aid as defined in claim 4 in which at least one column semigrid and one row semigrid have an equal number of columns and rows.

6. A mathematical teaching aid as defined in claim 2 in which at least one column semigrid and one row semigrid have an equal number of columns and rows.

7. A mathematical teaching aid as defined in claim 2 in which the indicator means of the space selector are positioned in relation to each other and the spaces of the grid in accordance with Rule A to segregate a portion of the spaces of the grid into two groups.

8. A mathematical teaching aid as defined in claim 2 in which the indicator means of the space selector are positioned in relation to each other and the spaces of the grid in accordance with Rule B to segregate a portion of the space of the grid into two groups.

9. A mathematical teaching aid as defined in claim 2 in which the indicator means of the space selector are positioned in relation to each other and the spaces of the grid in accordance with Rule C to segregate a portion of the spaces of the grid into two groups.

10. A mathematical teaching aid as defined in claim 2 in which the indicator means of the space selector are positioned in relation to each other and the spaces of the grid in accordance with Rule D to segregate a portion of the spaces of the grid into two groups.

11. A mathematical teaching aid as defined in claim 2 in which the indicator means of the space selector are positioned in relation to each other and the spaces of the grid in accordance with Rule E to segregate a portion of the spaces of the grid into two groups.

12. A mathematical teaching aid as defined in claim 2 in which the indicator means of the space selector are positioned in relation to each other and the spaces of the grid in accordance with Rule G to segregate a portion of the grid into two groups.

13. A mathematical teaching aid which comprises:

A. a base member having at least one surface with a numerical grid comprising rows and columns of spaces in at least two row and two column semigrids with each space having a numeral that is selected so that the algebraic sum of the numerals in any two abutting spaces in a row or column of one semigrid is equal to the algebraic sum of the numerals in two corresponding abutting spaces in a corresponding row or a column of another semigrid, and b. a space selector member which selectively overlies at least a portion of the grid having indicator means positioned in relation to each other and the spaces of the grid to segregate some of the spaces of the grid into two groups of spaces and a single space for mathematical processing such that the result of processing the numerals in the two groups is numerically equal to the numeral appearing in the single space.

PO-1050
(5/69)

UNITED STATES PATENT OFFICE
CERTIFICATE OF CORRECTION

Patent No. 3,603,005 Dated September 7, 1971

Inventor(s) Willis N. Dysart

It is certified that error appears in the above-identified patent and that said Letters Patent are hereby corrected as shown below:

Column 8, Line 2, change "2" to --3--;
Line 10, change "2" to --3--;
Line 13, change "2" to --3--;
Line 18, change "2" to --3--;
Line 21, change "space" to --spaces--;
Line 23, change "2" to --3--;
Line 28, change "2" to --3--;
Line 33, change "2" to --3--;
Line 38, change "2" to --3--;
Line 41, after "portion" insert --of the spaces--;
Line 54, after "grid" insert --in accordance with Rule F--.

Signed and sealed this 21st day of March 1972.

(SEAL)
Attest:

EDWARD M.FLETCHER,JR.
Attesting Officer

ROBERT GOTTSCHALK
Commissioner of Patents